United States Patent
Shazeer et al.

(10) Patent No.: US 9,141,589 B2
(45) Date of Patent: Sep. 22, 2015

(54) METHOD AND AN APPARATUS TO PROVIDE A PERSONALIZED PAGE

(75) Inventors: Noam M. Shazeer, Palo Alto, CA (US); Georges Harik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 527 days.

(21) Appl. No.: 13/280,826

(22) Filed: Oct. 25, 2011

(65) Prior Publication Data

US 2015/0169507 A1    Jun. 18, 2015

Related U.S. Application Data

(63) Continuation of application No. 12/778,862, filed on May 12, 2010, now abandoned, which is a continuation of application No. 11/077,571, filed on Mar. 9, 2005, now abandoned.

(51) Int. Cl.
*G06F 17/30*  (2006.01)
*G06F 17/22*  (2006.01)

(52) U.S. Cl.
CPC ........ *G06F 17/2235* (2013.01); *G06F 17/3053* (2013.01)

(58) Field of Classification Search
CPC ...................... G06F 17/30867; G06F 17/30905
USPC .......................................................... 707/705
See application file for complete search history.

(56) References Cited

U.S. PATENT DOCUMENTS

| | | | |
|---|---|---|---|
| 6,839,680 B1 * | 1/2005 | Liu et al. ...................... | 705/7.33 |
| 6,981,040 B1 * | 12/2005 | Konig et al. ................. | 709/224 |
| 7,082,407 B1 * | 7/2006 | Bezos et al. ................. | 705/26.7 |
| 7,739,126 B1 * | 6/2010 | Cave et al. ...................... | 705/2 |
| 2001/0021914 A1 * | 9/2001 | Jacobi et al. ...................... | 705/8 |
| 2002/0111994 A1 * | 8/2002 | Raghunandan ............... | 709/203 |
| 2002/0173997 A1 | 11/2002 | Menard et al. | |
| 2002/0188554 A1 * | 12/2002 | Holbrook ........................ | 705/37 |
| 2003/0101214 A1 * | 5/2003 | Kumhyr et al. ............... | 709/203 |
| 2003/0105682 A1 * | 6/2003 | Dicker et al. .................... | 705/27 |
| 2003/0227479 A1 * | 12/2003 | Mizrahi et al. ................. | 345/753 |
| 2005/0102202 A1 * | 5/2005 | Linden et al. ................... | 705/27 |
| 2005/0154637 A1 * | 7/2005 | Nair et al. ........................ | 705/14 |
| 2006/0053090 A1 | 3/2006 | Cotter et al. | |
| 2006/0112079 A1 * | 5/2006 | Holt et al. .......................... | 707/3 |

\* cited by examiner

*Primary Examiner* — Mohammad S Rostami
(74) *Attorney, Agent, or Firm* — Harrity & Harrity, LLP

(57) ABSTRACT

A method and an apparatus to provide a personalized page to a user have been disclosed. In one embodiment, a user is identified as a member of a first group and a member of a second group. The first group's level of interest (LOI) in a first item is identified, as well as the second group's LOI in a second item. The user's LOI in at least one of the first and second items is identified.

26 Claims, 6 Drawing Sheets

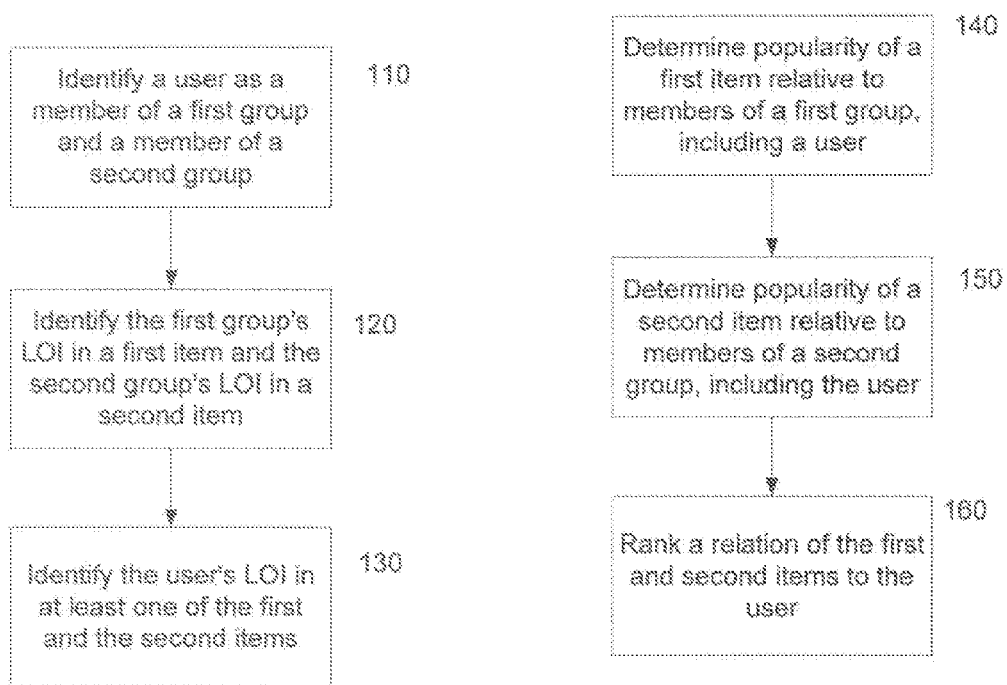

METHOD AND AN APPARATUS TO PROVIDE A PERSONALIZED PAGE

The present patent application is a continuation of U.S. application Ser. No. 12/778,862, filed on May 12, 2010 now abandoned, which is a continuation of U.S. application Ser. No. 11/077,571, filed on Mar. 9, 2005 now abandoned.

BACKGROUND

With the increasing use of the Internet, lots of information becomes available on the Internet. Some of the information is interesting to a user while some of the information is of little value to the user. Conventionally, users can use online search engines to search for specific information the users are interested in. Typically, the users search for the specific information because the users need such information. However, there is some information potentially interesting to the users but the users may not need the information. Sometimes, the users may not even be aware of the existence of such information on the Internet. Thus, the users probably do not actively search for this information on the Internet.

Currently, some online service providers and/or individuals provide pages of interesting items. In the description herein, items include a variety of information available on the internet, such as news articles, websites, products, etc. For example, there are currently pages of most searched queries, pages of most viewed news stories, blogs created by individuals on specific topics, etc. In general, the items on these pages are typically chosen based on the interest in these items among the general population. Furthermore, these pages are typically accessible by the general public. Although these pages and blogs may include some items that may be potentially interesting to a user, these pages and blogs are also likely to include a lot of items that the user may not care about at all. Hence, the user may not keep coming back to visit these pages.

SUMMARY

In one embodiment, a user is identified as a member of a first group and a member of a second group. The first group's level of interest (LOI) in a first item is identified, as well as the second group's LOI in a second item. The user's LOI in at least one of the first and the second items is identified.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 1A illustrates a flow diagram of one embodiment of a process to provide interesting items to a user;

FIG. 1B illustrates a flow diagram of an alternative embodiment of a process to provide interesting items to a user;

DETAILED DESCRIPTION

Overview of One Embodiment

Figure 2A:
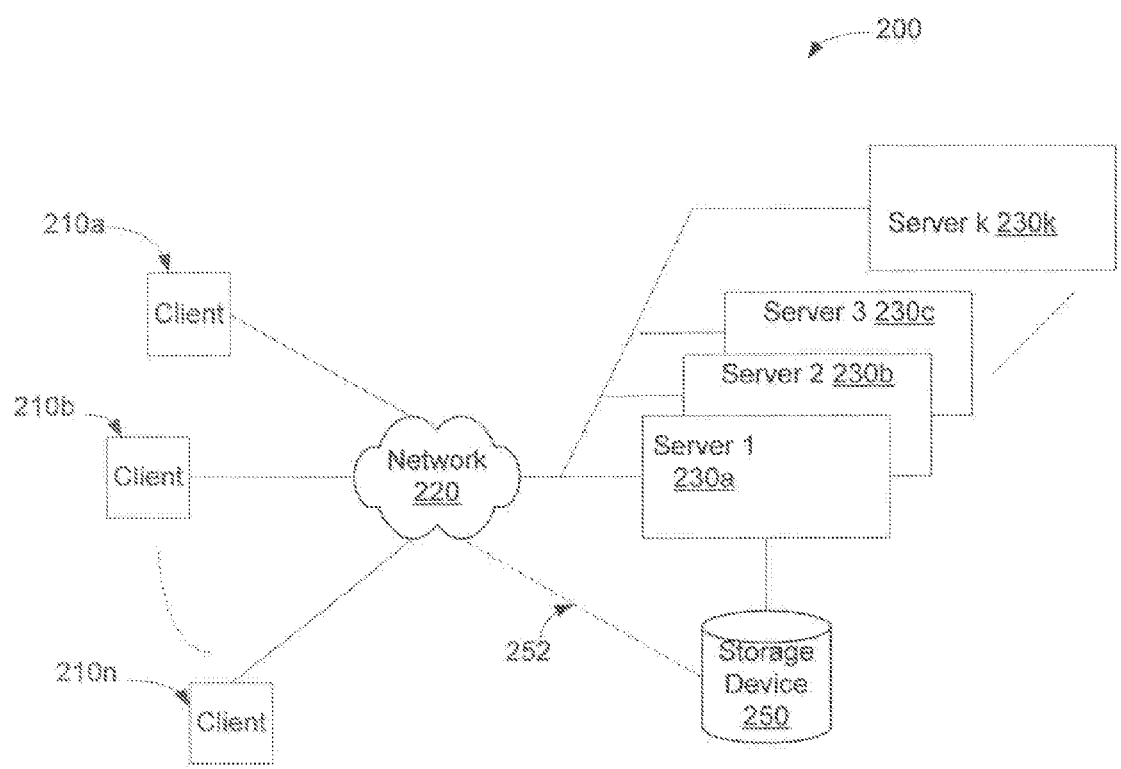
FIG. 2A illustrates one embodiment of a system usable with some embodiments of the invention.

A method and an apparatus to provide a personalized page to a user are described. In one embodiment, a user is identified to be associated with different groups. The popularity or the levels of interest of a number of items among members of the different groups are determined. Then the popularity or the levels of interest of these items relative to the user are determined. Based on the popularity or the levels of interest relative to the user, some or all of these items are provided to the user in a document, such as a webpage personalized to the user. Since the items are provided to the user based on the popularity relative to the user, the user may find the items provided more interesting.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Description of Process

FIG. 1A illustrates a flow diagram of one embodiment of a process to provide interesting items to a user. The processes, as described herein, may be performed by processing logic that may comprise hardware (e.g., circuitry, dedicated logic, etc.), software (such as a program or a script, operable to run on a general-purpose computer system or a dedicated machine), or a combination of both.

In some embodiments, processing logic identifies a user as a member of a first group and a member of a second group (processing block 110). A group may be defined based on one or more common features shared by members of the group. For instance, a group may be defined by the age of the members (e.g., age 11-18, 19-30, 31-40, etc.), the profession of the members (e.g., software engineers, medical professionals, etc.), the residence addresses of the members (e.g., San Francisco residents, New York City residents, etc.), etc.

Then processing logic identifies the first group's level of interest (LOI) in a first item and the second group's LOI in a second item (processing block 120). In some embodiments, a group's LOI in an item is indicated by the popularity of the item among members of the group. In the description herein, LOI and popularity are used interchangeably.

Furthermore, certain actions performed by the members of the group on the item may reflect how popular the item is among the members. In other words, a group's LOI in an item may be based on some predetermined actions performed by members of the group. Examples of such actions include searching for the item, viewing the item, emailing the item or information about the item to others, purchasing the item, services related to the item, and/or products related to the item, etc.

In some embodiments, processing logic identifies the user's LOI in at least one of the first and the second items based on the first group's LOI in the first item and/or the second group's LOI in the second item (processing block 130). Details of how the popularity of an item relative to the user is identified based on the popularity of the item relative to the corresponding group in the item are discussed below.

Based on the user's LOI in the first and/or the second items, processing logic may provide the identified items to the user in a variety of ways. For example, links to the items can be put into a document. Reference to a document as used herein may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. hypertext markup language (HTML) or extensible markup language (XML)), a file coded in a scripting language (e.g. JavaScript, Active Server Pages (ASP), or Perl), or a file viewed in a web browser (e.g. a portable document format (PDF), an image file or text file). A document may reside on a single system, or may be accessed by one or more systems via a network, e.g. an Intranet or the Internet.

Access to the personalized webpage may be limited to the user and authorized individuals. Alternatively, the items may be sent (e.g., via electronic mail) to the user on demand or periodically. Since these items are identified based on the user's LOI in the items, the user may find these items interesting, and hence, the user may access the personalized web page more often. Furthermore, providing these items to the user in a page may save the user time in searching for these items.

FIG. 1B illustrates a flow diagram of an alternative embodiment of a process to provide interesting items to a user. Initially, processing logic determines popularity of a first item relative to members of a first group, including a user (processing block 140). As mentioned above, a group may be defined based on one or more common features shared by members of the group. Processing logic may determine the popularity of the first item relative to the members of the first group in a variety of ways. In some embodiments, processing logic defines a popularity score relative to the first group for the first item and determines the popularity score based on some predetermined actions performed by the members of the first group on the first item. For instance, the popularity score relative to the first group for the first item may be computed based on the frequency at which the item is accessed (e.g., viewed, emailed, purchased, etc.) by the members of the first group. More details on some exemplary embodiments of the determination of various popularity scores are discussed below.

Processing logic further determines popularity of a second item relative to members of a second group, which includes the user (processing block 150). Again, processing logic may determine the popularity of the second item relative to the members of the second group in a variety of ways. In some embodiments, processing logic defines a popularity score relative to the second group for the second item and determines the popularity score based on actions performed by the members of the second group on the second item. Note that the popularity scores of the first and second items may or may not be determined in the same manner. More details on some exemplary embodiments of the determination of various popularity scores are discussed below.

Then processing logic ranks a relation of the first and second items to the user (processing block 160). The relation of the first and second items to the user may be ranked based on the popularity scores of the first and the second items relative to the first and the second groups, respectively. In some embodiments, processing logic determines a popularity score for each of the first and the second items relative to the user based on the popularity scores of the first and the second items relative to the first and the second groups, respectively. Using the popularity scores relative to the users for the first and the second items, processing logic may rank the relation of the first and the second items to the user. More details on the use of the popularity scores relative to the users to rank the relation of items are discussed below.

Based on the result of ranking the relation of the first and the second items to the user, processing logic may provide the first and/or the second items to the user in a variety of ways. For example, links to the items can be put into a personalized webpage. Access to the personalized webpage may be limited to the user and authorized individuals. Alternatively, the items may be sent (e.g., via electronic mail) to the user on demand or periodically. Note that the above examples are intended to illustrate the concept, not to limit the scope of the appending claims.

Determination of Popularity of Items

Figure 3A:
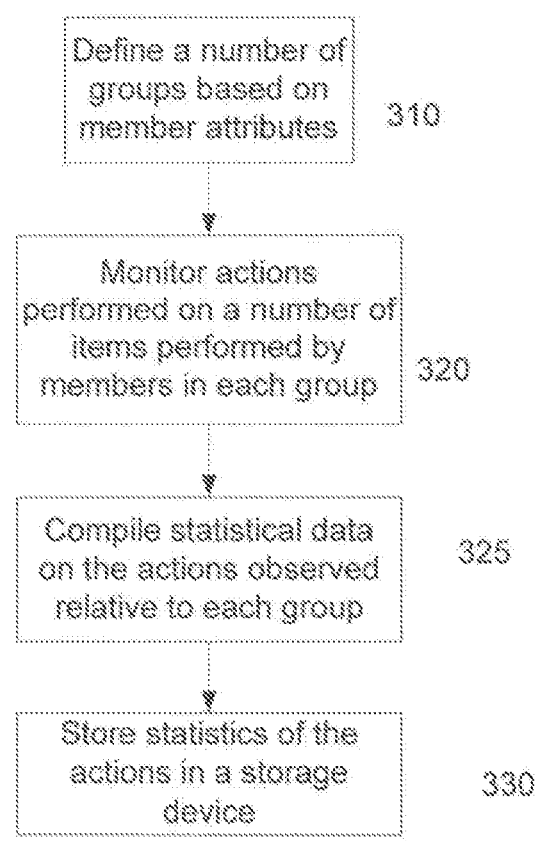
FIG. 3A shows a flow diagram of one embodiment of a process to determine popularity of items relative to a number of groups.

In some embodiments, popularity of items relative to a user is determined based on popularity of the items relative to a number of groups to which the user belongs. FIG. 3A shows a flow diagram of one embodiment of a process to determine popularity of items relative to a number of groups.

In some embodiments, processing logic defines a number of groups based on one or more common attributes or features of the respective members in the groups (processing block 310). As discussed above, a group may be defined by the age of the members (e.g., age 11-18, 19-30, 31-40, etc.), the profession of the members (e.g., software engineers, medical professionals, etc.), the residence of the members (e.g., San Francisco residents, New York City residents, etc.), etc.

Processing logic monitors actions performed on a number of items by the respective members in each group (processing block 320). The actions performed may include viewing an item, emailing an item to others, searching for an item, purchasing an item or services related to an item, etc. These actions may be performed on an item in a variety of ways in which the user can be observed, for example, clicking on a link to the item, visiting a website containing the item, or entering a query to search for item, etc. Alternatively, processing logic may monitor activities or actions of the respective members in electronic mail, discussion on blogs, photographs on online photo processing services, etc. with the consent of the respective members.

In some embodiments, using the actions observed, processing logic compiles statistical data for the items relative to different groups (processing block 325). There are a variety of ways to compile the statistical data. For example, the statistical data of an item relative to a group is based on the number of times the members of the group performs a predetermined action on an item. In one embodiment, compiling the statistical data includes computing a popularity score of an item relative to a group. The popularity score of an item relative to a group may be defined as the number of times members of the group perform a predetermined action on the item divided by the total number of times the members of the group perform the predetermined action on any item. For instance, suppose the total number of viewing of the news story, "Faultline discovered in San Francisco Bay Area," by members of a group of San Francisco residents is 3000, and the total number of viewing of any news story by members of the group of San Francisco residents is 4000. Then the popularity score of the news story, "Faultline discovered in San Francisco Bay Area," relative to the group of San Francisco residents is 3000/4000=0.75.

In an alternative embodiment, compiling the statistical data includes determining a recent popularity score relative to a group. The recent popularity score relative to a group may be defined as the number of times members of the group perform a predetermined action on the item within a predetermined period divided by the total number of times the members of the group perform the predetermined action on any item within the predetermined period. The predetermined period can be defined as any period, such as a certain month, a week before a certain date or the occurrence of a certain event, an hour after a certain time on a certain date or the occurrence of a certain event, etc. For example, suppose the total number of viewing of the news story, "Hottest High Tech Gifts in 2004," by members of a group of engineers in December 2004 is 3000, and the total number of viewing of any news story by members of the group of engineers is 5000. Then the recent popularity score of the news story in December 2004, "Hottest High Tech Gifts in 2004," relative to the group of engineers is 3000/5000=0.6.

Alternatively, compiling the statistical data may include determining a rise in popularity relative to a group. The rise in popularity relative to a group may be defined as:

$$\Delta Pop = (Nc - Np)/Np, \text{ where}$$

$\Delta Pop$ is the rise in popularity relative to a group, Nc is the number of times the members of the group performs a predetermined action on the item within a predetermined period, and Np is the number of times the members of the group performs the predetermined action on the item within a preceding period.

Again, the predetermined period can be defined as any period, such as a certain month, a week before a certain date or the occurrence of a certain event, an hour after a certain time on a certain date or the occurrence of a certain event, etc. For example, suppose the total number of viewing of the news story, "Hottest High Tech Gifts in 2004," by members of a group of engineers in December 2004 is 3000, and the total number of viewing of this news story by members of the group of engineers is 500 in November 2004. Then the rise in popularity of the news story, "Hottest High Tech Gifts in 2004," relative to the group of engineers is (3000-500)/500=5. Note that techniques similar to those described above may be applied to compute a drop in popularity relative to a group.

One should appreciate that the above embodiments of the process to compile statistical data are described to illustrate the concept, not to limit the scope of the appending claims. In view of the above description, it should be apparent to one of ordinary skill in the art that the statistical data can be compiled in various ways in addition to those explicitly described above.

Figure 2B:
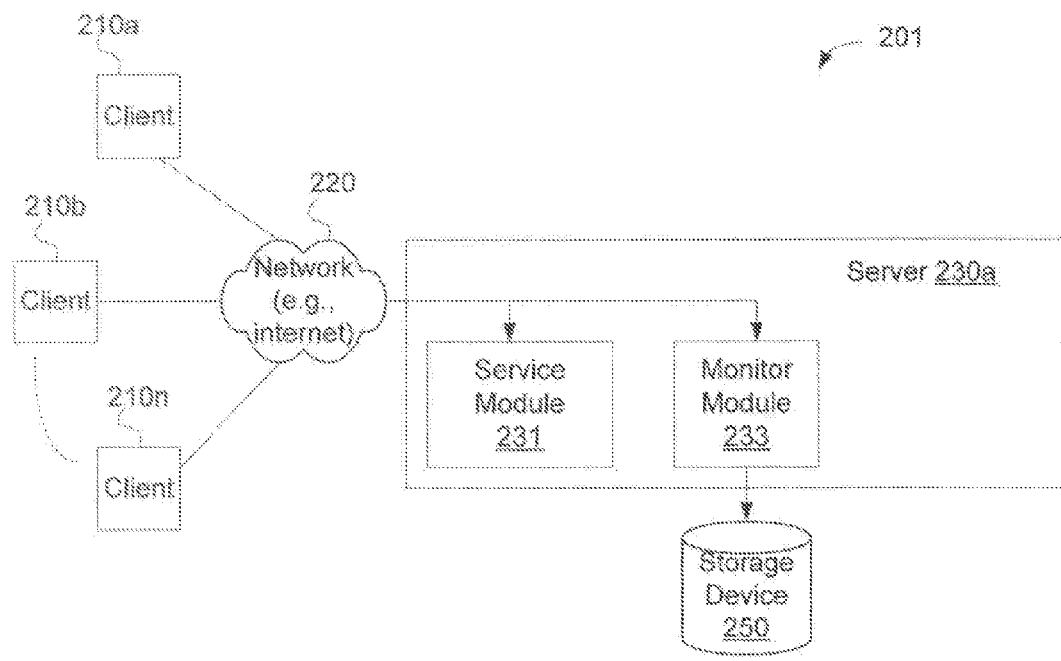
FIG. 2B illustrates one embodiment of a system usable with some embodiments of the invention.

Referring back to FIG. 3A, processing logic stores the statistical data compiled in processing block 325 into a storage device, such as the storage device 250 in FIG. 2B (processing block 330). The statistical data stored may be used later to determine the popularity of the items relative to a user. Details of some embodiments of the determination of the popularity of an item relative to a user are described below.

Figure 3B:
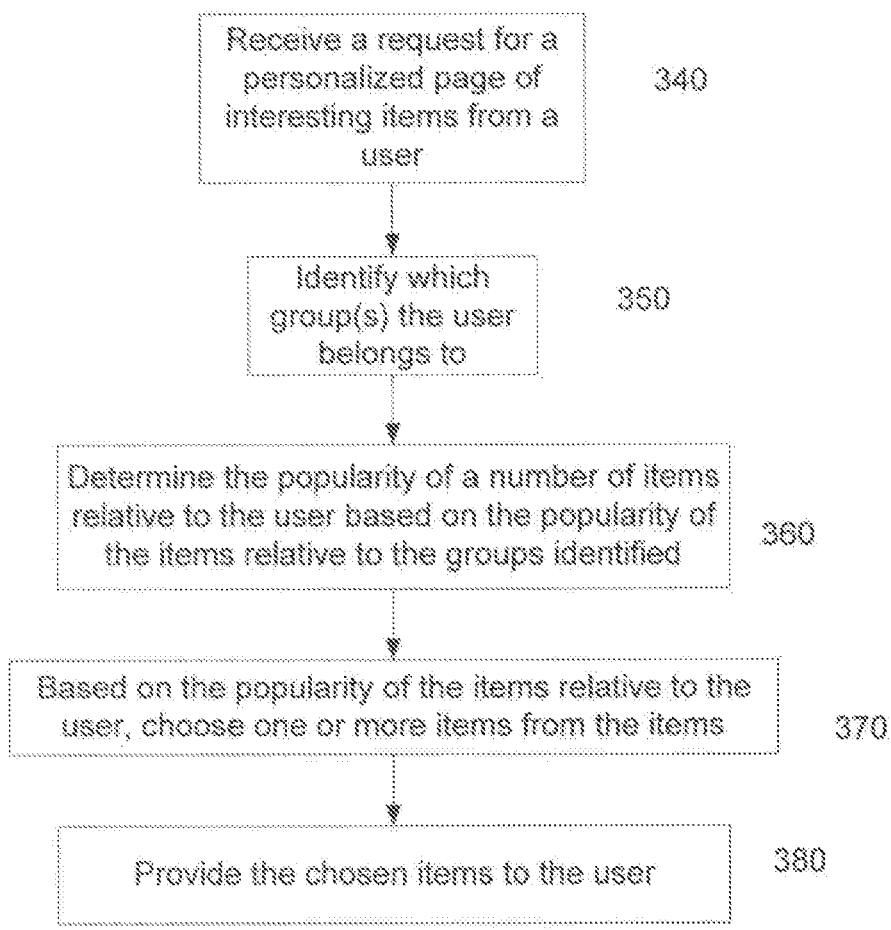
FIG. 3B shows a flow diagram of one embodiment of a process to determine popularity of items relative to a user.

FIG. 3B shows a flow diagram of one embodiment of a process to determine popularity of items relative to a user. Processing logic receives a request from a user for a document (e.g., a personalized page) of interesting items (processing block 340). In some embodiments, the user logs onto a personal account and clicks on a link or a tab in a personal home page to request access to the personalized page of interesting items. Alternatively, the user may have designated the personalized page of interesting items to be his personal home page whenever he logs onto his account. In an alternative embodiment, the user may have submitted a request (e.g., filling in a request form online, sending a request via electronic mail, etc.) for a personalized page of interesting items to be sent to the user (e.g., via electronic mail). Furthermore, the personalized page may be sent on demand or periodically.

In some embodiments, processing logic has collected some predetermined information from the user with the user's permission. For example, the user may have been asked to provide some predetermined information of the user (e.g., residence address, age, profession, etc.) when the user sets up his account with an online service provider (e.g., electronic mail service providers, online retailers, etc.). Based on the user's information, processing logic identifies which group(s) the user belongs to (processing block 350). For example, suppose the user is a software engineer living in San Francisco. Furthermore, the user has indicated that he is interested in Rock and Roll music. Then processing logic may identify the following groups for the user: a group of San Francisco residents, a group of engineers, and a group of Rock and Roll fans.

The processing logic then determines the popularity of a number of items relative to the user based on the popularity of the items relative to the groups identified (processing block 360). In some embodiments, the popularity of an item relative to the user is expressed as a popularity score relative to the user. The popularity score of the item relative to the user may be derived from the popularity of the item relative to the identified groups, which can be expressed as popularity scores relative to the identified groups. Examples of various popularity scores relative to a group have been described above with reference to FIG. 3A. Processing logic may compute the popularity score of an item relative to the user using the popularity scores of the item relative to the identified groups in a variety of ways, some of which are described in details below to illustrate the concept.

In one embodiment, processing logic compares the popularity scores of an item relative to the identified groups and chooses the maximum popularity score out of these popularity scores. Then processing logic assigns the maximum popularity score relative to the identified groups to be the popularity score of the item relative to the user. For instance, continuing with the above example, the identified groups to which the user belongs to includes a group of San Francisco residents, a group of engineers, and a group of Rock and Roll fans. Suppose the popularity score of the news story, "Faultline discovered in San Francisco Bay Area" is 0.75 relative to the group of San Francisco residents. Furthermore, suppose this news story's popularity scores relative to the group of engineers and the group of Rock and Roll fans is 0.55 and 0.05, respectively. Then processing logic may assign the maximum popularity score relative to these groups to be the popularity score of this news story relative to the user, i.e., 0.75.

Based on the popularity of the items relative to the user, processing logic may choose one or more items from the items (processing block 370). In some embodiments, processing logic chooses a predetermined number of items with the highest popularity scores relative to the user. For example, processing logic may choose ten items having the highest popularity scores relative to the user. Alternatively, processing logic may choose items having popularity scores exceeding a predetermined threshold. For instance, processing logic may choose the items having popularity scores over 0.8.

In an alternative embodiment, processing logic adds up the popularity scores of an item relative to the identified groups. Then processing logic assigns the sum of these popularity scores to be the popularity score of the item relative to the user. Again, in the above example, the sum of the three popularity scores relative to the identified groups is 0.75+0.55+0.05=1.35. Thus, processing logic may determine the popularity score of the item relative to the user to be 1.35.

In another alternative embodiment, processing logic computes the average of the popularity scores of an item relative to the identified groups. Processing logic then assigns the average to be the popularity score of the item relative to the user. Once again, in the above example, the average of the three popularity scores relative to the identified groups is (0.75+0.55+0.05)/3=0.45. Thus, processing logic may determine the popularity score of the item relative to the user to be 0.45.

In some embodiments, processing logic assigns weights to the identified groups. The weight assignment may be based on inputs from the user. For example, the user described above may indicate that he is more interested in items related to Rock and Roll music than items related to San Francisco. Then processing logic may assign greater eight (e.g., 8) to the group of Rock and Roll fans and a smaller weight (e.g., 5) to the group of San Francisco residents. Using the weight assigned, processing logic computes a weighted average of the popularity scores of an item relative to the identified groups. The weighted average is assigned to be the popularity score of the item relative to the user. Continuing with the above example, suppose the popularity score of the webpage, "www.sfsymphony.org" relative to the group of San Francisco residents is 0.7 and the popularity score of this webpage among the group of rock and roll fans is 0.1. The weighted average of these two popularity score is about (0.7*5)+(0.1*8)/(5+8)=0.33. Thus, the popularity score of "www.sfsymphony.org" relative to the user is about 0.33.

Finally, processing logic provides the chosen items to the user (processing block 380). The chosen items can be provided to the user via a variety of channels. In some embodiments, processing logic constructs a personalized webpage containing the items and/or links to the chosen items. The user may access the personalized webpage by logging onto his account online via the Internet or an Intranet. Alternatively, processing logic may send a page showing the chosen items or a document including the links to the chosen items to the user (e.g., via electronic mail) periodically or on demand. For example, an electronic newsletter containing the links to the chosen items may be emailed to the user every week. In an alternative embodiment, processing logic may provide the chosen items in a set of web pages, each page including some of the chosen items. Furthermore, the web pages may include user interface control (e.g., buttons) to allow the user to go from one web page to another. Alternatively, processing logic may provide the chosen items to the user on one or more blogs designated by the user, in photographs via online photo processing services, etc.

Furthermore, the chosen items may be presented to the user in different ways. In some embodiments, processing logic may list the chosen items in decreasing order of the popularity scores of the chosen items. Alternatively, processing logic may put the chosen items into different categories (e.g., news, movies, retailers, pop singers, sports events, etc.) and present the chosen items to the user by these categories. Alternatively, processing logic may categorize the chosen items by the groups in which the chosen items are of interest to. For example, chosen items that are of interest to a group of San Francisco residents may be put together to present to the user, while chosen items that are of interest to a group of Rock and Roll fans may be put together to present to the user.

Figure 3C:
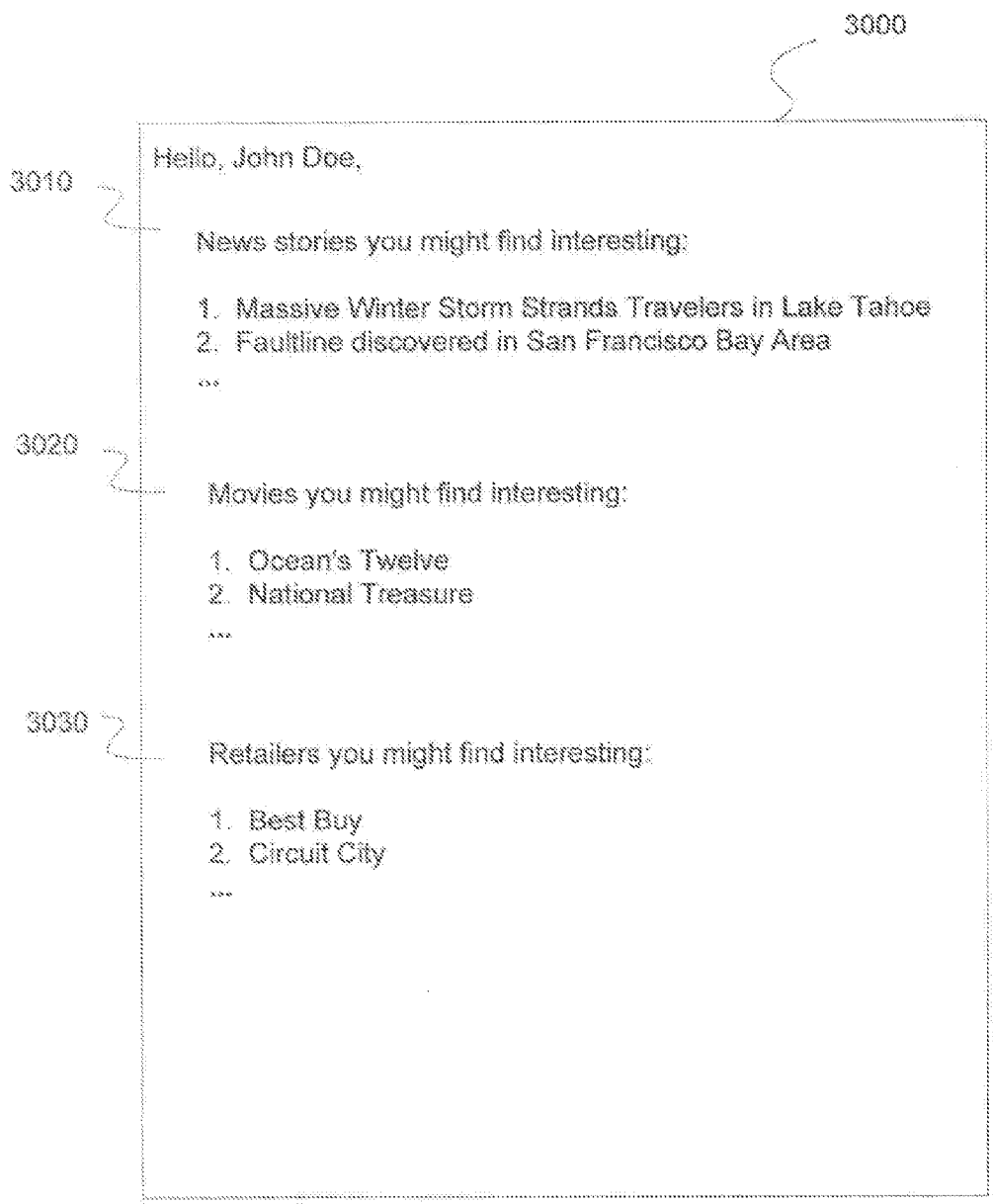
FIG. 3C shows an exemplary embodiment of a page of interesting items provided to a user.

FIG. 3C shows an exemplary embodiment of a personalized page of interesting items provided to a user. The page 3000 includes categories of items that may be interesting to the user, John Doe. Some exemplary categories shown in FIG. 3C includes news stories 3010, movies 3020, and retailers 3030 that the user may find interesting. Within each of the categories, the items may be arranged in decreasing order of the popularity or LOT relative to the user. In some embodiments, the page 3000 is periodically updated. Alternatively, an updated version of the page 3000 is constructed each time the user requests to access the page 3000.

Since the items listed in the page 3000 are chosen based on the popularity or LOT relative to the user, the user may find these items interesting. Hence, the user may visit the page 3000 more often. Furthermore, providing the interesting items to the user in a personalized page may make it easier for the user to browse through these items, and hence, may save the user time in searching and accessing these items.

System Architecture

FIG. 2A illustrates one embodiment of a system usable with some embodiments of the invention. The system 200 includes a number of client machines 210a-210n, a network 220, a number of servers 230a-230k, and a storage device 250. The client machines 210a-210n are coupled to the network 220. The network 220 is further coupled to the servers 230a-230k. The servers 230a-230k are coupled to the storage device 250. In some embodiments, the storage device 250 is coupled to the network 220 as well without going through the servers 230a-230k.

In some embodiments, the client machines 210a-210n include devices that are usable to access the network 220 and devices coupled to the network 220 (e.g., the servers 230a-230k). Some examples of the client devices 210a-210n include desktop personal computers (PCs), laptop PCs, personal digital assistants (PDAs), cellular telephones, etc. The client machines 210a-210n may be coupled to the network 220 via wireline connection, wireless connection, or a combination of both.

The network 220 may include a variety of networks, such as the Internet, local area network (LAN), etc. The network 220 may be an open public network, an Intranet, or a combination of both. In addition to the client machines 210a-210n, the network 220 is further coupled to the servers 230a-230k.

The servers 230a-230k may be coupled to each other in addition to the network 220. Furthermore, the servers 230a-230k are coupled to the storage device 250. Although multiple servers 230a-230k are illustrated in FIG. 2A, some embodiments of the invention may be implemented using a single server coupled to the network 220.

As mentioned above, the system 200 further includes the storage device 250. The storage device 250 may include a variety of data storage devices, such as optical disks, magnetic disks, optical-magnetic disks, read-only memories (ROMs), random access memories (RAMs), CD-ROMs, EPROM, EEPROM, magnetic or optical cards, etc. Although the storage device 250 is illustrated in FIG. 2A as a single stand-alone device, portions of the storage device 250 may reside on one or more of the servers 230a-230k in some embodiments. Alternatively, the entire storage device 250 may reside on one or more of the servers 230a-230k. In some embodiments, the storage device 250 is coupled to the network 220 without going through the servers 230a-230k (as indicated by the dotted line 252 in FIG. 2A). Thus, some or all of the client machines 210a-210k may access the storage device 250 via the network 220 without going through the servers 230a-230k. For example, data may be downloaded to one or more of the client machines 210a-210n periodically or on demand.

Note that any or all of the components and the associated hardware illustrated in FIG. 2A may be used in various embodiments of the system 200. However, it should be appreciated that other configurations of the system 200 may include more or fewer devices than those shown in FIG. 2A.

Architecture of a System to Collect Statistical Data

FIG. 2B illustrates one embodiment of a system usable with some embodiments of the invention. The system 201 includes a number of client machines 210a-210n, a network 220, a storage device 250, and a server 230a. In some embodiments, the server 230 further includes a service module 231 and a monitor module 233. Note that any or all of the components and the associated hardware illustrated in FIG. 2B may be used in various embodiments of the system 201. However, it should be appreciated that other configurations of the system 201 may include more or fewer components or modules than those shown in FIG. 2B.

As mentioned above, the server 230 includes various modules, such as the service module 231. Note that the modules 231 and 233 may reside on a single server 230a as illustrated in FIG. 2B. Alternatively, the modules 231 and 233 may reside on multiple servers (e.g., servers 230a-230k in FIG. 2A) that are coupled to each other. Furthermore, some or all of the multiple servers may be local or remote.

Referring back to FIG. 2B, members of a number of groups may use the client machines 210a-210n to send requests regarding some items (e.g., webpages, news articles, products, etc.) to the service module 231 via the network 220. In response to the requests, the service module 231 may provide services to the members. For example, the service module 231 may include a search engine and the requests from the members may include search queries. In response to the search queries from the client machines 210a-210c, the search engine performs searches for items specified in the search queries.

In another example, the service module 231 may provide an online shopping website engine and the requests from the members may include requests to view details of certain products and/or requests to purchase certain products. In response to the requests to view details of certain products, the service module 230 may send the details of the products to the respective client machines 210a-210b via the network 220. In response to the requests to purchase certain products, the service module 230 may place an order for the products for the requesting members.

Furthermore, in an alternative example, the service module 231 may include an electronic mail engine and the requests may include requests to forward certain articles, files, and/or documents to a designated electronic mail account. In response to the request to forward a file to a designated recipient, the electronic mail engine sends the file in an electronic mail to the designated recipient.

In some embodiments, the monitor module 233 is coupled to the service module 231 to monitor the requests sent to the service module 231. Based on the requests observed, the monitor module 233 generates statistical data on the requests submitted from the members of the groups. For example, the statistical data may include the number of times an item is selected by members of a group divided by the total number of selection the members of the group requested, the number of times an item is selected by members of a group within a predetermined time period (e.g., an hour, a day, a week, etc.), and the change in the frequency an item is selected by members of a group, etc. Note that "selection of an item" as used in the current context includes a variety of ways in which a member can be observed to identify the item, such as clicking on a link to the item, visiting a web page showing the item, issuing a query to search for the item, etc.

Referring back to FIG. 2B, the monitor module 233 is further coupled to the storage device 250. In some embodiments, the monitor module 233 stores the statistical data generated into the storage device 250.

Architecture of a System to Determine Popularity of Items

Figure 2C:
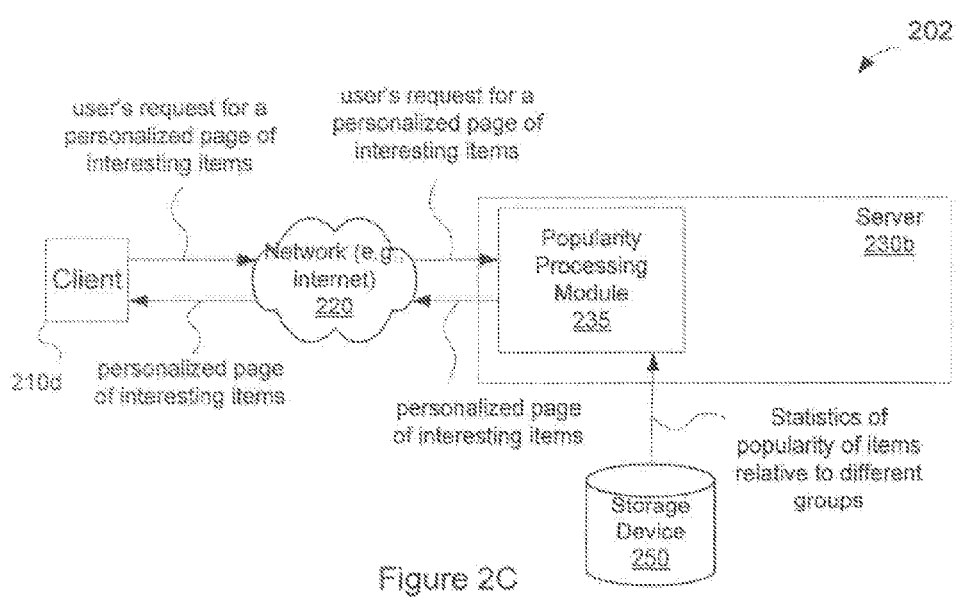
FIG. 2C illustrates one embodiment of a system usable with some embodiments of the invention.

FIG. 2C illustrates one embodiment of a system usable with some embodiments of the invention. The system 202 includes a client machine 210d, a network 220, a storage device 250, and a server 230b. The server 230b further includes a variety of modules. For example, as illustrated in FIG. 2C, the server 230b includes a popularity processing module 235. Note the server 230b may include more or fewer modules than those illustrated in FIG. 2C. Furthermore, the module 235 may reside on a single server as illustrated in FIG. 2C or on multiple servers in different embodiments. Furthermore, the multiple servers may be local or remote. Note that the server 230b may further includes modules that manage and/or service the user's account in addition to the popularity processing module 235. In some embodiments, one or more of the modules 231 and 233 in FIG. 2B reside on the same server on which the popularity processing module 235 resides.

In some embodiments, a user uses the client machine 210d to send a request for a document (e.g., a personalized page) of interesting items to the network 220. Via the network 220, the request is forwarded to the popularity processing module 235 in the server 230b. For example, the user may have registered with an online service provider. Using the client machine 210d, the user may log onto his account to send a request for a personalized page of interest items to the server 230b operated by the online service provider.

In response to the request from the user, the popularity processing module 235 retrieves statistical data on popularity of items relative to different groups to which the user belongs from the storage device 250. Using the statistical data retrieved, the popularity processing module 235 determines the popularity of the items relative to the user. Based on the popularity of the items relative to the user, the popularity processing module 235 selects at least one of the items and put the selected items into a personalized page of interesting items. Then the popularity processing module 235 sends the personalized page of interesting items to the network 220. Via the network 220, the personalized page of interesting items is sent to the client machine 210d, through which the personalized page is provided to the user.

Although illustrated in FIGS. 2B and 2C as distinct modules or components, the various modules or components may be located or co-located within either the servers 230a and 230b or one or more of the client machines 210a-210d. For example, in some embodiments, portions of the popularity processing module 235 may be resident on the client machine 210d. Furthermore, in some embodiments, portions of the storage device 250 may be resident on the client machine 210d, where the statistical data may be periodically downloaded from the storage device 250 to the client machine 210d.

Furthermore, although the modules are illustrated in FIGS. 2B and 2C as discrete blocks, FIGS. 2B and 2C are intended more as a functional description of some embodiments of the invention rather than a structural mapping of the functional elements. One of ordinary skill in the art would recognize that an actual implementation might have the functional elements grouped or split among various modules in different ways.

General Legal Statements

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   identifying, by a device, information associating a user as a member of a first group and information associating the user as a member of a second group,
      the first group being different than the second group;
   receiving, by the device and from the user, user indication information associated with a level of interest in the first group and a level of interest in the second group;
   calculating, by the device, a measure of the first group's level of interest (LOI) in an item and a measure of the second group's LOI in the item;
   calculating, by the device and based on the calculated measure of the first group's LOI in the item and the calculated measure of the second group's LOI in the item and using the information identifying the user as the member of the first group and the member of the second group, a measure of the user's LOI in the item,
      calculating the measure of the user's LOI in the item including:
         determining a first score for the item relative to the first group;
         determining a second score for the item relative to the second group;
         performing a mathematical operation on the first score and the second score, by applying a variable associated with the level of interest in the first group to the first score and by applying a variable associated with the level of interest in the second group to the second score, to determine a third score,
            the third score being associated with the measure of the user's LOI in the item;
   comparing, by the device, the third score to a threshold value; and
   providing, by the device and when the third score satisfies the threshold value, a document that includes information identifying the item.

2. The method of claim 1, wherein calculating the measure of the user's LOI in the item includes:
   calculating the measure of the user's LOI in the item based on a relationship of the user to the first group relative to a relationship of the user to the second group.

3. The method of claim 2, wherein the relationship of the user to the first group and the relationship of the user to the second group are weighted.

4. The method of claim 1, wherein the document is one of a webpage or an electronic mail sent to the user.

5. The method of claim 1, wherein the document is personalized to the user.

6. The method of claim 1, further comprising:
   providing the user access to the document based on the user logging onto an account of the user to access the document.

7. The method of claim 1, wherein providing the document comprises:
   providing, in the document, the item in an ordered list of items,
      a location of the item, in the ordered list of items, being based on the user's LOI in the item.

8. The method of claim 1, wherein
   the first group's LOI in the item reflects a popularity of the item among members of the first group, and
   the second group's LOI in the item reflects a popularity of the item among members of the second group.

9. A method comprising:
   calculating, by a device, a first popularity score of an item relative to members of a first group,
      the first group including a user;
   calculating, by the device, a second popularity score of the item relative to members of a second group,
      the second group including the user;
   receiving, by the device and from the user, user indication information associated with a level of interest in the first group and a level of interest in the second group;
   performing, by the device, a mathematical operation on the first popularity score and the second popularity score, by applying a variable associated with the level of interest in the first group to the first popularity score and by applying a variable associated with the level of interest in the second group to the second popularity score, to determine a third popularity score;
   calculating, by the device and based on the third popularity score, a measure of a level of interest, associated with the user, in the item;
   comparing, by the device, the third popularity score to a threshold value;
   ranking, by the device, the item with respect to one or more other items to generate a ranked list of items; and
   providing, by the device and when the third popularity score satisfies the threshold value, a document that includes information identifying the ranked items,
      the ranked items including the item.

10. The method of claim 9, wherein calculating the first popularity score of the item comprises:
    determining a frequency at which the item is accessed by one or more of the members of the first group.

11. The method of claim 9, wherein the item is a news article.

12. A non-transitory computer-readable storage medium including instructions, the instructions comprising:
one or more instructions which, when executed by a processor of a device, cause the processor to:
identify information associating a user as a member of a first group and information associating the user as a member of a second group;
receive, from the user, user indication information associated with a level of interest in the first group and a level of interest in the second group;
calculate a measure of the first group's level of interest (LOI) in an item and a measure of the second group's LOI in the item;
calculate, based on the calculated measure of the first group's LOI in the item and the calculated measure of the second group's LOI in the item and using the information identifying the user as the member of the first group and the member of the second group, a measure of the user's LOI in the item,
the one or more instructions to calculate the measure of the user's LOI in the item including:
one or more instructions to determine a first score of the item relative to the first group;
one or more instructions to determine a second score of the item relative to the second group; and
one or more instructions to perform a mathematical operation on the first score and the second score, by applying a variable associated with the level of interest in the first group to the first score and by applying a variable associated with the level of interest in the second group to the second score, to determine a third score,
the third score being associated with the measure of the user's LOI in the item;
compare the third score to a threshold value; and
provide, when the third score satisfies the threshold value, a document that includes information identifying the item.

13. The computer-readable storage medium of claim 12, wherein the one or more instructions to calculate the measure of the user's LOI in the item includes:
one or more instructions to calculate the measure of the user's LOI in the item based on a relationship of the user to the first group relative to a relationship of the user to the second group.

14. The computer-readable storage medium of claim 13, wherein the relationship of the user to the first group and the relationship of the user to the second group are weighted.

15. The computer-readable storage medium of claim 12, wherein
the first group's LOI in the item reflects a popularity of the item among members of the first group, and
the second group's LOI in the item reflects a popularity of the item among members of the second group.

16. An apparatus comprising:
a memory to store instructions; and
a processor to execute the instructions to:
identify information associating a user as a member of a first group and information associating the user as a member of a second group;
receive, from the user, user indication information associated with a level of interest in the first group and a level of interest in the second group;
calculate a measure of the first group's level of interest (LOI) in an item and a measure of the second group's LOI in the item;
calculate, based on the calculated measure of the first group's LOI in the item and the calculated measure of the second group's LOI in the item and using the information identifying the user as the member of the first group and the member of the second group, a measure of the user's LOI in the item,
the processor, when calculating the measure of the user's LOI in the item, being to:
determine a first score for the item relative to the first group;
determine a second score for the item relative to the second group; and
perform a mathematical operation on the first score and the second score, by applying a variable associated with the level of interest in the first group to the first score and by applying a variable associated with the level of interest in the second group to the second score, to determine a third score,
the third score being associated with the measure of the user's LOI in the item;
compare the third score to a threshold value; and
provide, when the third score satisfies the threshold value, a document that includes information identifying the item.

17. The method of claim 1, wherein providing the document further comprises:
selecting a predetermined quantity of items,
each of the predetermined quantity of items satisfying the threshold value; and
providing, in the document, information identifying the predetermined quantity of items.

18. The method of claim 1, wherein providing the document further comprises:
selecting all items that satisfy the threshold value; and
providing, in the document, information identifying the items.

19. The method of claim 1, wherein calculating the measure of the user's LOI in the item further comprises:
assigning a first weight to the first score;
assigning a second weight to the second score; and
using the first weight and the second weight to determine the third score.

20. The method of claim 1, wherein
calculating the measure of the first group's LOI in the item comprises:
determining a change in popularity of the item relative to the first group, calculating the measure of the second group's LOI in the item comprises:
determining a change in popularity of the item relative to the second group, and calculating the measure of the user's LOI in the item comprises:
calculating the measure of the user's LOI in the item based on the change in the popularity of the item relative to the first group and the change in the popularity of the item relative to the second group.

21. The computer-readable storage medium of claim 12, wherein the one or more instructions to provide the document further include:
one or more instructions to select a predetermined quantity of items,
each of the predetermined quantity of items satisfying the threshold value; and
one or more instructions to provide, in the document, information identifying the predetermined quantity of items.

22. The computer-readable storage medium of claim 12, wherein the one or more instructions to calculate the measure of the user's LOI in the item further include:

one or more instructions to assign a first weight to the first score;
one or more instructions to assign a second weight to the second score; and
one or more instructions to use the first weight and the second weight to determine the third score.

23. The computer-readable storage medium of claim 12, wherein
the one or more instructions to calculate the measure of the first group's LOI in the item include:
one or more instructions to determine a change in popularity of the item relative to the first group,
the one or more instructions to calculate the measure of the second group's LOI in the item include:
one or more instructions to determine a change in popularity of the item relative to the second group, and
the one or more instructions to calculate the measure of the user's LOI in the item include:
one or more instructions to calculate the measure of the user's LOI in the item based on the change in the popularity of the item relative to the first group and the change in the popularity of the item relative to the second group.

24. The apparatus of claim 16, wherein the processor, when providing the document, is further to:
select a predetermined quantity of items, each of the predetermined quantity of items satisfying the threshold value; and
provide, in the document, information identifying the predetermined quantity of items.

25. The apparatus of claim 16, wherein the processor, when calculating the measure of the user's LOI in the item, is further to:
assign a first weight to the first score;
assign a second weight to the second score; and
use the first weight and the second weight to determine the third score.

26. The apparatus of claim 16, wherein
the processor, when calculating the measure of the first group's LOI in the item, is further to:
determine a change in popularity of the item relative to the first group,
the processor, when calculating the measure of the second group's LOI in the item, is further to:
determine a change in popularity of the item relative to the second group, and
the processor, when calculating the measure of the user's LOI in the item, is further to: calculate the measure of the user's LOI in the item based on the change in the popularity of the item relative to the first group and the change in the popularity of the item relative to the second group.

* * * * *